Aug. 12, 1941.  E. W. WORK  2,252,152
PRESSURE CONTROL VALVE
Filed Dec. 15, 1939
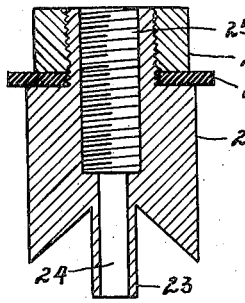
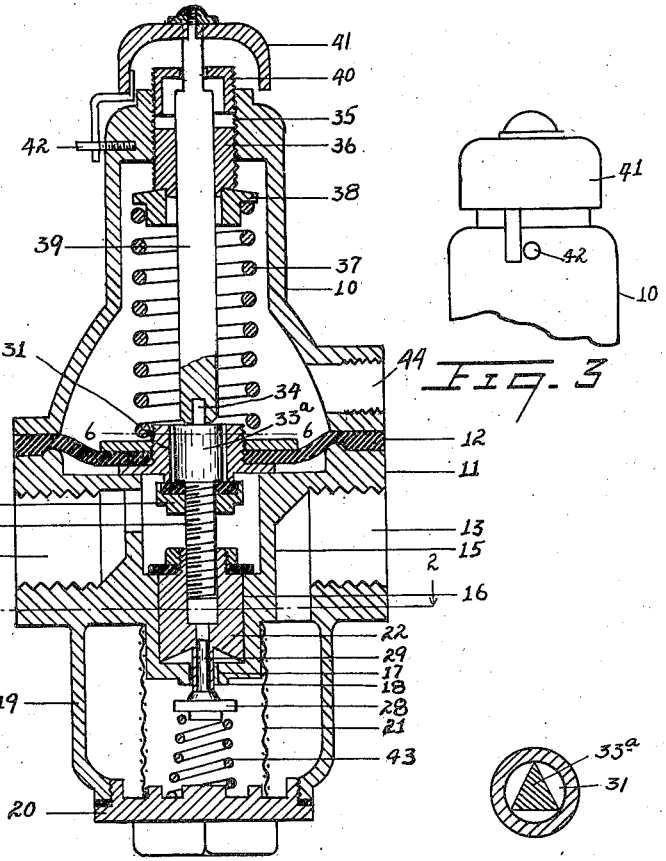
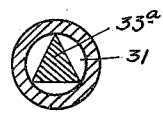
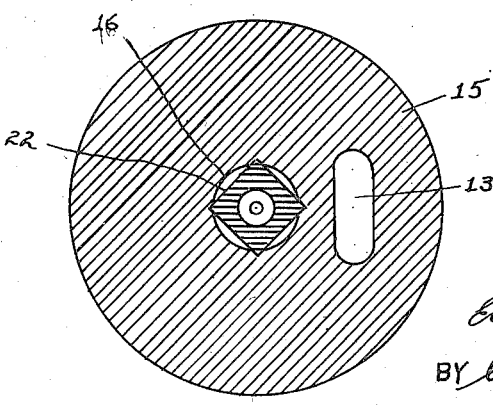
INVENTOR
Ernest Willy Work
BY
ATTORNEY.

Patented Aug. 12, 1941

2,252,152

UNITED STATES PATENT OFFICE 2,252,152

PRESSURE CONTROL VALVE

Ernest Willy Work, New Britain, Conn., assignor to Patent Development Company Limited, Toronto, Ontario, Canada, a company Application December 15, 1939, Serial No. 309,357

2 Claims. (Cl. 50—23)

This invention relates to a pressure control mechanism for maintaining the pressure in a water pressure system within maximum and minimum predetermined limits, said valve being of the class which comprises a body having inlet, outlet and discharge ports, fluid pressure operated inlet and relief valves controlling the flow of fluid from the inlet ports to the outlet ports, and from the outlet ports to the discharge ports respectively, means for opening and closing each of said valves as the pressure rises above or falls below predetermined maximum and minimum pressures respectively.

One of the disadvantages of this class of valve has been that there is no provision for regulating the inlet valve for different pressures at the actual site of installation but it has been necessary in each case to return such valve to the factory for resetting to each particular requirement. This procedure was necessary with the class of valves of this type heretofore constructed since in order to obtain a new pressure setting for the intake valve it was necessary to readjust the relief valve, which adjustment is obtained by the proper relationship between the spring pressure acting on the diaphragm carrying the relief valve, and the means for unseating the relief valve when the diaphragm moves in response to excess pressure. The facilities for making such an adjustment are not available ordinarily to the workman installing such a valve on the job.

One of the objects of this invention is to provide a pressure control valve of the class described in which provision is made for adjusting the pressure at which the inlet valve will open and close, such adjustment being made without disturbing the relief pressure or the adjustment by means of which the relief pressure is obtained.

This object is attained by providing the control valve mechanism with a vertically adjustable member for unseating the inlet valve when the pressure falls below the predetermined minimum pressure and means operated from the exterior of the valve body for effecting the vertical adjustment of said member.

There are various ways in which my invention may be constructed and for that reason I do not limit my invention to the preferred construction described in the following specification and illustrated in the accompanying drawing.

Another advantage of this present invention is that it is much simpler in construction than valves of this class heretofore constructed and the initial setting of the relief pressure and inlet pressure are more easily effected.

In the drawing,

Figure 1 is a vertical cross-section of a valve constructed in accordance with my invention;

Figure 2 is a cross-sectional view on the line 2—2, Figure 1;

Figure 3 is a fragmentary elevation of the top portion of the valve;

Figure 4 is an enlarged cross-sectional view of the vertically adjustable member for unseating the inlet valve shown in Figure 1; and Figure 5 is an enlarged elevation of the inlet valve; and Figure 6 is a cross-section on line 6—6, Figure 1.

Like characters of reference refer to like parts throughout the specification and drawing.

The control valve illustrated in the drawing comprises a hollow body consisting of a hollow top head 10 and a hollow main body portion 11, a diaphragm 12, which has its marginal portions anchored between the hollow top head 10 and the main body 11. The main body portion is provided with an inlet 13 adapted for connection to a supply of water or other fluid under pressure, an outlet 14 adapted for connection to a fluid pressure system, the pressure in which is to be controlled between maximum and minimum pressure limits, and a partition 15 separating the inlet ports from the outlet ports. The partition 15 is formed with a well 16 which is circular in cross-section. Formed through the partition centrally in the bottom of the well 16 is a passageway 17 and at the entrance to the passage 17 is an inlet valve seat 18. The main body 11 is provided below the partition 15 with an enlarged portion 19 which is closed at the bottom by a removable plug 20. Extending from the plug 20 to the partition 15, and entirely surrounding the inlet passage 17, is a cylindrically shaped screen 21 which is provided for the purpose of preventing any dirt passing through the inlet valve into the system.

Located in the well 16 and vertically slidable therein is a member 22 which is rectangular in cross-section. The four vertical corners of the member 16 slide in vertical grooves formed in the well 16 so that the member is held against rotation but is freely slidable in a vertical direction. The member 22 is provided with an extension 23 which enters and passes through the passageway 17. The extension 23 is provided with a central bore 24 therethrough, which bore extends completely through the member 22, the upper portion 25 of the bore being enlarged, the enlarged portion of which is screw threaded for the purpose hereinafter described. The member 22 is also provided with a rubber valve 26 which is held in place by a nut 27, the valve 26 serving as a back pressure check valve. The valve 26 is made of thin flexible rubber to allow for free passage of water from the inlet into the system.

The inlet passage 17 is normally closed by a valve 28 which seats against the valve seat 18. The valve 28 carries a valve stem 29 which is slidably entered into the bore 24 and a shoulder 30 which is engageable by the lower end of the extension 23 in the manner hereinafter described.

The diaphragm 12 carries the excess pressure relief means consisting of a discharge passage 31 which is in axial alignment with the inlet passage 17, a valve disc 32 normally closing the passage 31 and which remains seated during predetermined travel of the diaphragm 12 in response to predetermined pressure variation within the system and which is unseated in the manner hereinafter described when the diaphragm moves in response to excess pressure. The disc 32 is carried on a threaded spindle 33 which is threaded into the portion 25 of the member 22. The spindle 33 extends through the valve disc 32, and terminates in an enlarged section 33ᵃ which extends through the passageway 31. The enlarged section 33ᵃ is triangular in cross-section as shown in Figure 6 to allow free passage of water through the passage 31. The top of the section 33ᵃ is provided with a stud 34 which is rectangular in cross section.

The head 10 is provided at the top with an interiorly threaded bore 35 which is co-axial with the passageways 17, 31, and into this bore is threaded an adjustable compression screw 36. A compression spring 37 is located within the head and abuts against the ring 38 and the diaphragm 12. The ring 38 has a sliding contact with the lower end of the compression screw 36. The compression screw is provided with a central bore therethrough into which is slidably entered a vertically movable distance piece 39. The lower end of the distance piece 39 is formed with a recess, rectangular in cross-section, and of the same dimensions as the stud 34, into which the stud 34 is entered. The distance piece 39 is provided for the purpose of unseating the relief valve 32 when the diaphragm moves in response to excess pressure and this is accomplished by providing an adjustable stop member 40 which is threaded into the bore 35. Mounted on the top of the distance piece 39 is a cap 41 which serves as a handle by means of which the pin 39 is rotated to effect the adjustment of the inlet valve 28 in the manner hereinafter described. The head 10 is provided with a stop 42. A spring 43 acting on the inlet valve 28 urges the inlet valve and the relief valve 32 towards their respective seats. The head portion 10 is provided with a discharge port 44 through which the excess fluid which passes through the passageway 31 escapes.

The adjustment of the pressure at which the inlet valve and the relief valve will respectively open and close is obtained in the following manner. The approximate pressure to which the relief valve will be unseated is effected approximately by the proper adjustment of the spring 37. The adjustable stop member 40 is then rotated in the bore 35 so that it will arrest the movement of the distance piece 39 and thus unseat the relief valve 32 when the diaphragm moves in response to excess pressure within the system. It will be observed that the relief valve 32 remains seated and follows the movement of the diaphragm during predetermined travel of the diaphragm at all pressures below the maximum pressure of the system. It will also be observed that the member 22 moves in unison with the relief valve 32.

The intake pressure is controlled by the distance between the relief valve and the member 22. With the relief pressure fixed, it will now be apparent that the closing of the intake valve can be regulated by moving the member 22 towards and away from the relief valve 32. This is accompanied by turning the cap 41 to rotate the spindle 39. This causes the member 33 to rotate moving member 21 upwards or downwards, thus adjusting the pressure at which the extension 23 will engage and disengage from the shoulder 30 to respectively unseat and allow the valve 28 to reseat. The pin 42 serves as a stop to prevent the adjustment of the inlet pressure above a predetermined maximum with respect to the relief pressure. In the drawing, the inlet valve is shown in open position and in this position it is held open by the extension 23 which engages with the shoulder 30 of the inlet valve. Fluid then flows through the passage 17 into the system. As the pressure in the system rises, the diaphragm 12 moves upwardly in response to the increase in pressure and carries with it the relief valve 32 and the member 22. As soon as the minimum pressure is reached, the extension 23 moves out of contact with the shoulder 30, allowing the valve 28 to seat and close the passage 17. The diaphragm 12 continues to move upwardly until the maximum pressure is reached and upon further movement in response to excess pressure, the movement of the relief valve 32 is arrested by the distance piece 39 engaging with the stop 40 but the diaphragm continues its movement and moves the relief valve seat out of contact with the valve disc 32 and thus allows any excess pressure to escape. When the pressure within the system falls below predetermined minimum, the extension 23 again engages the shoulder 30 of the inlet valve 28 and pushes the inlet valve open, allowing sufficient water or fluid to flow into the system to bring the pressure therein up to the predetermined minimum.

What I claim as new and desire to protect by Letters Patent of the United States is:

1. In a control valve mechanism for maintaining the pressure in a fluid pressure system between maximum and minimum pressures comprising a body having inlet, outlet and discharge ports, fluid pressure operated inlet and relief valves for controlling the flow of fluid from the inlet port to the outlet port and from the outlet port to the discharge port respectively, and means for opening and closing said valves as the pressure rises above or falls below predetermined maximum and minimum pressures respectively, means for varying the pressure at which the inlet valve will open and close without affecting the setting of the relief pressure comprising a threaded extension carried by said relief valve, a non-rotatable member mounted on said extension for unseating the inlet valve at a predetermined pressure, means for manually rotating said relief valve and the threaded extension to change the position of the non-rotatable member with respect to the relief valve thereby changing the pressure at which the inlet valve will be unseated by said member.

2. A control valve mechanism for maintaining the pressure of a pressure system within predetermined maximum and minimum pressures, comprising a body having inlet, outlet and discharge ports, said inlet port being adapted for connection to a supply of fluid under pressure and said outlet adapted for connection to said system, fluid pressure operated inlet and relief valves for controlling the flow of fluid from the inlet port to the outlet port and from the outlet port to the discharge port respectively, said valves remaining seated between maximum and minimum pressures within the system, a stop member for unseating said relief valve when the pressure rises above the predetermined maximum pressure, means for rotating said relief valve by means of said stop member, a threaded extension carried by said relief valve, a non-rotatable member associated with said extension, said last mentioned member being moved by said relief valve to unseat said inlet valve when the pressure within the system falls below the predetermined minimum pressure, rotation of said relief valve adjusting the minimum pressure within the system at which the inlet valve will be unseated by said non-rotatable member.

ERNEST WILLY WORK.